United States Patent [19]
Ueda

[11] Patent Number: 4,721,982
[45] Date of Patent: Jan. 26, 1988

[54] ELECTROSTATIC LATENT IMAGE DEVELOPING APPARATUS

[75] Inventor: Masahide Ueda, Toyokawa, Japan

[73] Assignee: Minolta Camera Kabushiki Kaisha, Osaka, Japan

[21] Appl. No.: 839,985

[22] Filed: Mar. 17, 1986

[30] Foreign Application Priority Data

Mar. 22, 1985 [JP] Japan ................................ 60-59067

[51] Int. Cl.$^4$ ............................................. G03G 15/08
[52] U.S. Cl. ............................. 355/3 DD; 355/14 D; 118/653; 430/120
[58] Field of Search .......................... 355/3 DD, 14 D; 118/653, 636, 657, 658, 655; 430/120, 121, 122

[56] References Cited

U.S. PATENT DOCUMENTS

| | | | |
|---|---|---|---|
| 4,347,299 | 8/1982 | Ozawa et al. ................... | 430/122 |
| 4,433,904 | 2/1984 | Ikemoto et al. ................ | 355/3 DD |
| 4,457,613 | 7/1984 | Kopp et al. .................... | 355/14 D X |
| 4,478,512 | 10/1984 | Zoltner ........................... | 355/3 DD |
| 4,583,842 | 4/1986 | Shimono et al. ................ | 355/3 DD |

FOREIGN PATENT DOCUMENTS 56-11149  3/1981  Japan .

*Primary Examiner*—A. C. Prescott
*Attorney, Agent, or Firm*—Burns, Doane, Swecker & Mathis

[57] ABSTRACT

An improved electrostatic latent image developing apparatus which is capable of effecting sufficient mixing and stirring of developing material through smooth circulation and transportation of the developing material into two feeding passages disposed side by side without being stagnant at a downstream side end portion of each feeding passage, and also without being aggregated towards the downstream side of the feeding passage, so as to avoid uneven development in the axial direction of a developing sleeve.

8 Claims, 10 Drawing Figures

ELECTROSTATIC LATENT IMAGE DEVELOPING APPARATUS

BACKGROUND OF THE INVENTION

The present invention generally relates to electrophotography, and more particularly, to an electrostatic latent image developing apparatus used for developing electrostatic latent images formed on the surface of an electrostatic latent image support member in an electrophographic process and the like.

Generally, as the electrostatic latent image developing apparatus of this kind, there has conventionally been proposed an arrangement which is adapted to transport the developing material supported, in the form of a magnetic brush, on the outer peripheral surface of a developing sleeve, in a circumferential direction of said sleeve so as to develop the electrostatic latent image formed on the electrostatic latent image support member by causing the developing material to rub against the surface of said support member at a developing region where said developing sleeve and said electrostatic latent image support member confront each other. In the above arrangement, the developing material is to be supplied to the rear side of the developing sleeve with respect to the developing region thereof, and before the above time for supplying, it is required that the developing material (normally composed of a mixture of carrier and toner) has been fully mixed and stirred, with toner particles therein being sufficiently triboelectrically charged.

Accordingly, in order to fully mix and stir the developing material, it is conceived, as disclosed, for example, in FIGS. 6 and 7 of Japanese Patent Publication Tokkosho No. 56-11149, to open opposite ends of a partition wall for neighboring feeding passages, with a developing material stirring and feeding member such as a sleeve and the like incorporated with a magnet roller being disposed in each feeding passage so as to transport the developing material in directions opposite to each other, thereby to circulate the developing material through the two feeding passages based on the rotation of said members.

In the known developing material stirring and circulating mechanism as described above, however, the two feeding passages and the developing material stirring and feeding members are disposed in parallel relation to each other, and since end portions of the respective feeding passages in the feeding direction are closed to be stopped, the developing material in the state as it is collected or stagnant at these closed end portions and is laterally moved when pushed by the developing material subsequently fed thereto, thus flowing into the neighboring feeding passage through the openings formed in the partition wall. In other words, the developing material tends to be excessively large in amount at the downstream side of the feeding direction in each feeding passage, and to be excessively small in amount at the upstream side thereof, and therefore, deviation in the amount of the developing material takes place in the axial direction of the developing sleeve, thus inviting such a problem as uneven development.

SUMMARY OF THE INVENTION

Accordingly, an essential object of the present invention is to provide an improved electrostatic latent image developing apparatus which is capable of effecting sufficient mixing and stirring of developing material through smooth circulation and transportation of the developing material without being stagnant at a downstream side end portion of each feeding passage.

Another important object of the present invention is to provide an electrostatic latent image developing apparatus of the above described type in which the developing material is circulated for transportation without being aggregated towards the downstream side of the feeding passage so as to avoid uneven development in the axial direction of a developing sleeve.

In accomplishing these and other objects, according to one preferred embodiment of the present invention, there is provided an electrostatic latent image developing apparatus which includes a first feeding passage for feeding developing material in a first direction, a second feeding passage provided side by side, adjacent to the first feeding passage for feeding the developing material in a direction opposite to the first direction, a passage means for communicating the first and second feeding passages at least at opposite ends thereof, a developing sleeve having a magnet roller incorporated therein and capable of holding the developing material on its peripheral surface, and a supplying means for supplying part of the developing material circulated for feeding within the first and second feeding passages, onto the developing sleeve. The first and second feeding passages are disposed in a non-parallel relation to each other so that a downstream side end portion of at least either one of said feeding passages is located in a position higher than an upstream side end portion of the other of said feeding passages.

By the arrangement according to the present invention as described above, an improved electrostatic latent image developing apparatus has been presented through simple construction, with substantial elimination of disadvantages inherent in the conventional developing apparatuses of this kind.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
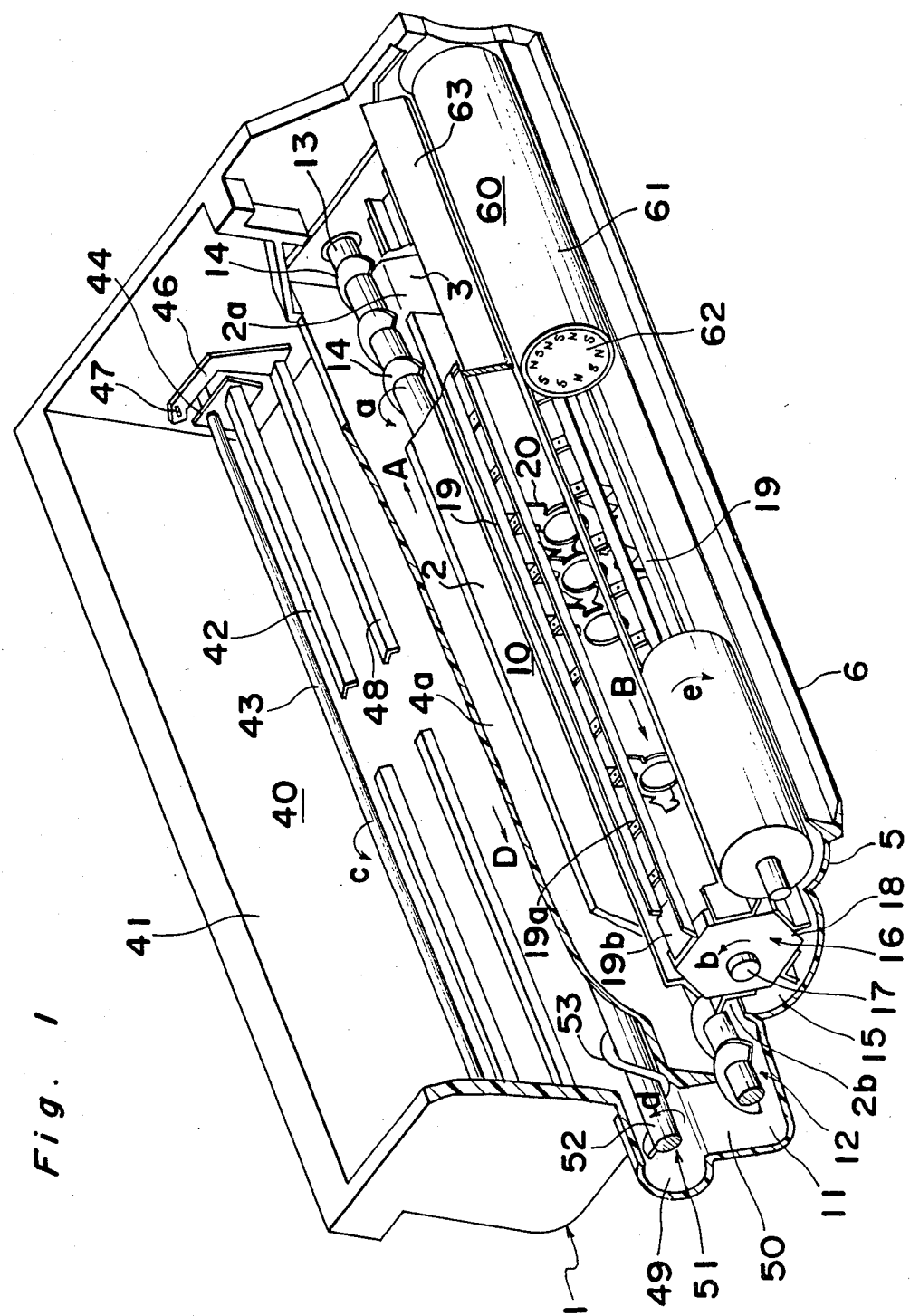
FIG. 1 is a perspective view, partly broken away, showing an electrostatic latent image developing apparatus according to one preferred embodiment of the present invention

Before the description of the present invention proceeds, it is to be noted that like parts are designated by like reference numerals throughout the accompanying drawings.

Figure 2:
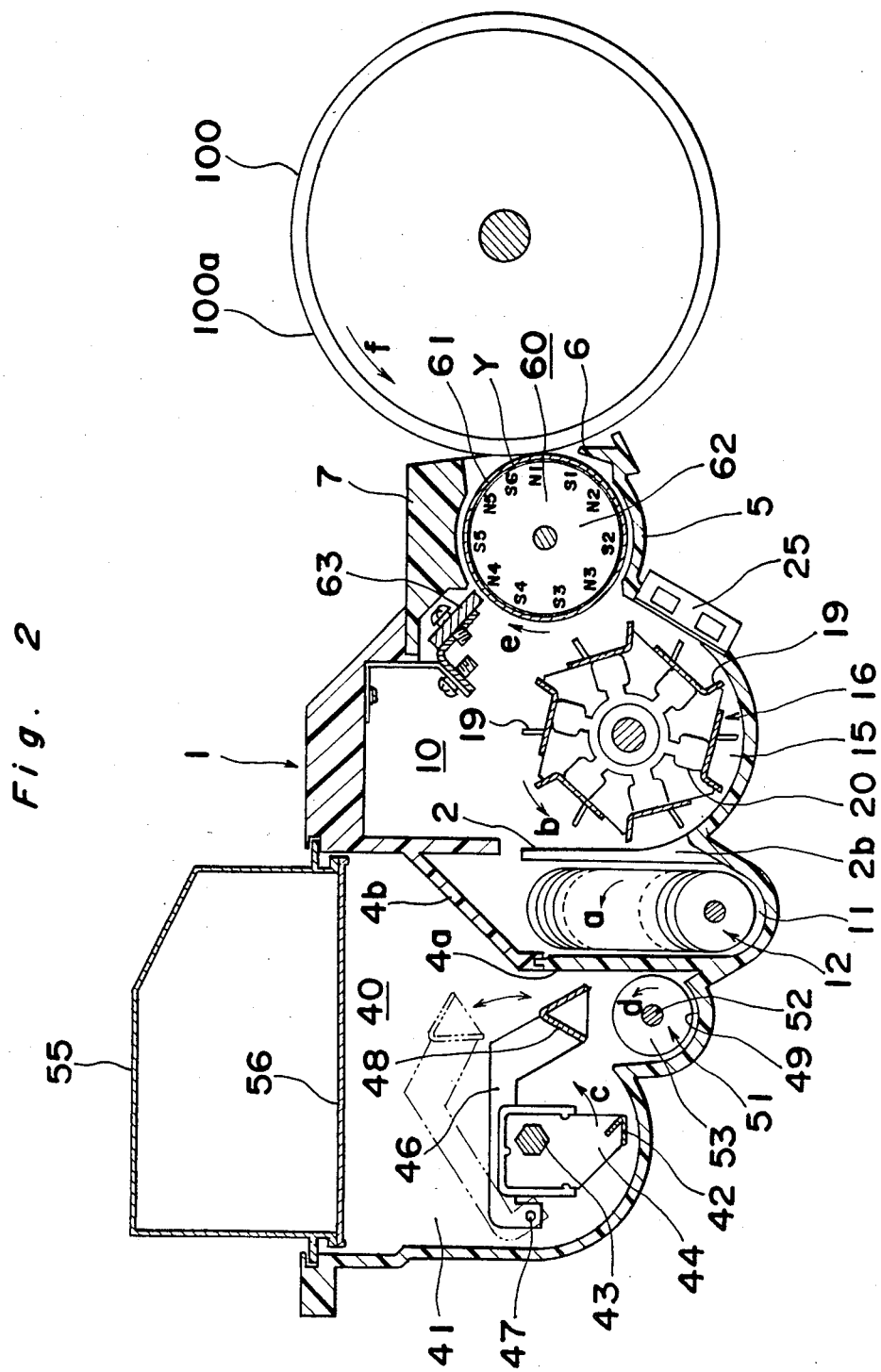
FIG. 2 is a side sectional view of the electrostatic latent image developing apparatus of FIG. 1 at a front portion thereof.
Figure 3:
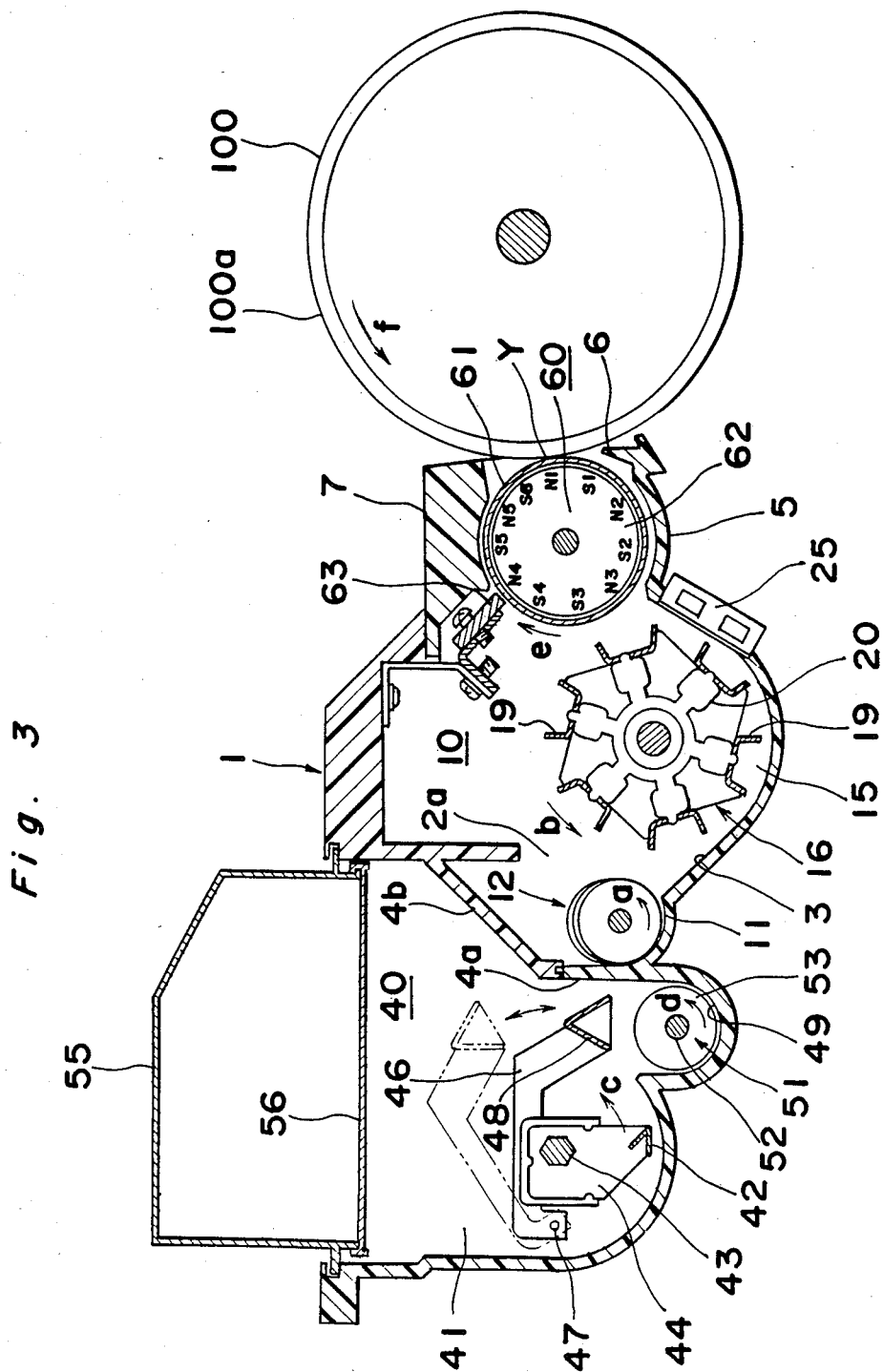
FIG. 3 is a view similar to FIG. 2, which is taken at a rear portion of FIG. 1.

Referring now to the drawings, there is shown in FIGS. 1 through 3, an electrostatic latent image developing apparatus according to one preferred embodiment of the present invention, which generally includes a casing or housing 1, and a developing material circulating and feeding section 10 provided with a screw roller 12 and a bucket roller 16, a toner accommodating section 40, and a developing section 60 including a developing sleeve 61 incorporated therein with a magnet roller 62, all of which are accommodated in said casing 1 in a manner as described hereinbelow.

The developing material circulating and feeding section 10 includes a developing material mixing/stirring and feeding passage 11 and a developing material supplying and feeding passage 15 which are respectively formed by bending the bottom portion of the casing 1 downwardly and separated from each other by a partition wall 2 extending upwardly from the bottom portion of said casing 1, while the feeding passages 11 and 15 are communicated with each other through openings 2a and 2b formed at opposite ends of the partition wall 2. The feeding passage 15 is directed in parallel with the developing sleeve 61, and the feeding passage 11 is inclined to a certain extent so as to be lower than the feeding passage 15 at the forward side, and to be higher than said feeding passage 15 at the rear side in FIG. 1, with the opening 2a being continued at an inclined face 3. This inclined face 3 has an angle equal to or larger than an angle of repose for the developing material so as to allow the developing material to flow smoothly.

The screw roller 12 includes a support shaft 13 and blade plates 14 fixed on said shaft 13 apparently in a spiral shape, and is provided in the feeding passage 11 at a similar inclination angle to said passage 11 so as to be driven for rotation in a direction indicated by an arrow (a). This screw roller 12 has a function to mix and stir the developing material, while feeding said developing material in a direction of an arrow A based on the rotation thereof in the direction of the arrow (a). Each of the blade plates 14 is cut out by about half so as to display a sufficient mixing and stirring function thereby.

Meanwhile, the developing material supplying and feeding passage 15 is disposed in a position lower than, but parallel to the developing sleeve 61, and is provided with a toner concentration sensor 25 of a magnetic detection type, in a position outside the portion of the casing 1 constituting the feeding passage 15, and near the end portion at the front side in FIG. 1.

Figure 4B:
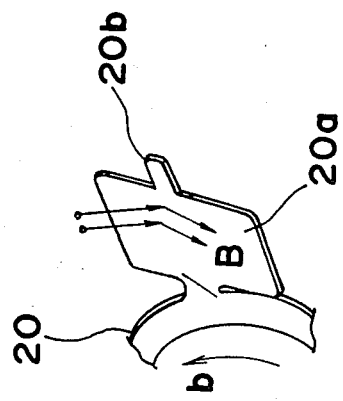
FIG. 4(b) is a fragmentary perspective view showing, on an enlarged scale, a blade plate employed in the bucket roller of FIG. 4(a)
Figure 4A:
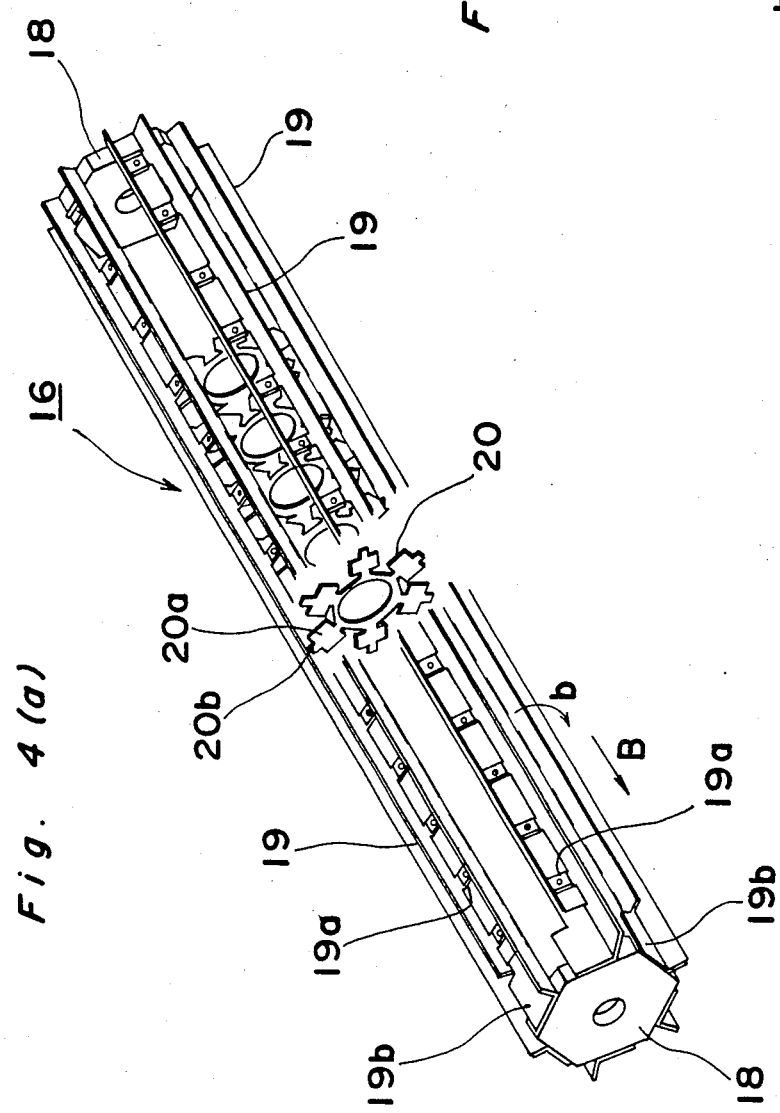
FIG. 4(a) is a fragmentary perspective view of a bucket roller employed in the developing apparatus of FIG. 1.

As shown in FIGS. 4 (a) and 4(b), the bucket roller 16 includes a support shaft 17 (FIG. 1), a pair of spaced hexagonal support plates 18 fixed at opposite ends of said shaft 17, bucket plates 19 connected between respective corresponding sides of the hexagonal support plates 18, and a plurality of spaced vane plates 20 attached inside the bucket plates 19 as illustrated. The bucket roller 16 is rotatably provided in the feeding passage 15 via the support shaft 17 extended through said roller 16 so as to be driven for rotation in a direction indicated by an arrow (b). Each of the bucket plates 19 has side portions extending outwardly therefrom and also openings formed in its bottom portion at equal intervals, with small pieces 19a left between the openings for assisting in free movement of the developing material. Meanwhile, the bottom portion 19b of each bucket 19 at the front side is left unremoved (FIG. 4(a)) so as to improve the transporting capacity for the developing material in the circumferential direction. Each of the vane plates 20 is formed, at the outer periphery of its central ring portion, with a plurality of vane portions 20a, each twisted towards the outer side of the ring portion at an angle of 15°, and is fixed within the bucket roller 16 by fitting a small projection 20b formed on each vane portion 20a into a corresponding opening formed in the small piece 19a of the bucket 19. This bucket roller 16 has functions to scoop up the developing material at the side portions of the buckets for feeding onto the outer peripheral surface of the developing sleeve 61 based on its rotation in the direction of the arrow (b), and also to transport said developing material in the direction of the arrow B by the vane plates 20. The vane plates 20 have the functions not only for feeding the developing material, but also for reinforcing the buckets 19 in the strength thereof, thereby to prevent the buckets 19 from warping or deflecting.

By the above construction, the developing material is transported in the direction of the arrow A within the feeding passage 11, and in the direction of the arrow B within the feeding passage 15 based on the rotation of the screw roller 12 in the direction of the arrow (a) and the rotation of the bucket roller 16 in the direction of the arrow (b). The developing material transported in the direction of the arrow A and arriving at the downstream side end portion of the feeding passage 11 is guided onto the inclined face 3 through the opening 2a so as to move into the feeding passage 15. Meanwhile, the developing material transported in the direction of the arrow B and reaching the downstream side end portion of the feeding passage 15 is scooped up by the bottom portions 19b of the bucket plates 19 and moves into the feeding passage 11 through the opening 2b so as to be fed through the feeding passages 11 and 15 for circulation.

In the above case, since the feeding level at the downstream side end portion in the feeding direction for feeding passage 11 is set to be higher than the feeding level at the downstream side for the other feeding passage 15, the developing material smoothly moves through the openings 2a and 2b between the feeding passages 15 and 11 without staying or being stagnant at the downstream side end portions of the respective feeding passages 11 and 15, and particularly, there is no tendency towards generation of one-sided or positionally aggregated developing material at the developing material supplying and feeding passage 15.

Meanwhile, part of the developing material is scooped up by the bucket plates 19 while being transported in the direction of the arrow B through the feeding passage 15, and is supplied onto the outer peripheral surface of the developing sleeve 61, where the supplying of developing material is uniform in the axial direction of the developing sleeve 61, since there is no deviation in the position of the developing material taking place in the feeding passage 15.

Moreover, fresh toner is replenished towards the upstream side of the feeding passage 11 from the toner accommodating section 40 to be described later, and is mixed and stirred together with the existing developing material in the feeding passage 11, while being transported in the direction of the arrow A so as to be sufficiently charged.

It should be noted here that, in the foregoing embodiment, although the feeding level is set to be higher than that of the neighboring feeding passages 15 and 11 not only at the downstream side end portion of the feeding passage 11, but also at the downstream side end portion of the feeding passage 15, the downstream side end portion of the feeding passage 15 need not necessarily be set as above, because at such downstream side end portion of the feeding passage 15, the developing material is scooped up by the bottom portions 19b of the bucket plates 19 so as to be, as it were, forcibly moved towards the upstream side of the feeding passage 11.

The toner accommodating section 40 includes a toner hopper 41 provided at the back of the feeding passage 11 through walls 4a and 4b (FIGS. 2 and 3), and a stirring member 42, empty state detecting plates 46 and a replenishing roller 51 provided in the toner hopper 41. At the upper portion of the toner hopper 41, there is detachably mounted a toner bottle 55 preliminarily filled with the toner to be replenished, and by sliding outwardly a bottom plate 56 of the toner bottle 55 functioning as a lid when detached, the replenishing toner is supplied into the hopper 41. The stirring member 42 is fixed at opposite ends of a support shaft 43 through plate members 44, with the shaft 43 being rotatably supported between the side walls of the hopper 41, and thus, is adapted to be driven for rotation in the direction of the arrow (c) about said support shaft 43. By the above rotation of the stirring member 42, undesirable bridging and blocking phenomena of toner in the toner hopper 41 may be prevented. The replenishing roller 51 includes a support shaft 52, and a feeding vane 53 spirally provided around said support shaft 52, and is provided in a replenishing passage 49 located at the bottom portion of the hopper 41 so as to be driven for rotation in the direction of the arrow (d). Additionally, the front side of the passage 49 is continued onto the feeding passage 11 through a toner replenishing inclined face 50 (FIG. 1), which is set at an angle equal to or larger than the repose angle of toner to allow the toner to flow smoothly.

More specifically, the toner in the hopper 41 is transported through the replenishing passage 49 in the direction of the arrow D based on the rotation of the replenishing roller 51 in the direction of the arrow (d), and is guided onto the inclined face 50 at the forward side in FIG. 1 so as to be supplied towards the upstream side of the feeding passage 11. This toner replenishing roller 51 is controlled for timing and time for its rotation by a toner replenishing control circuit based on the detecting signal of the toner concentration in the developing material within the feeding passage 15 as detected by the toner concentration detecting sensor 25 referred to earlier. Meanwhile, at the upstream side of said feeding passage 11, it is so arranged that toner collected by a cleaning device (not shown) is recycled by known means.

On the other hand, the empty state detecting plates 46 are each adapted to be pivotable about pins 47 along the opposite inner side walls of the hopper 41, with resisting plates 48 being fixed to forward end portions of the plates 46. Moreover, on the empty state detecting plate 46 at the forward portion in FIG. 1 (not shown), a magnet (not shown) is fixed, with a reed switch to be turned on or off by the contact or spacing of said magnet being provided at the confronting inner side wall face. These empty state detecting plates 46 are arranged to engage the stirring member 42 so as to be upwardly moved, following rotation of the stirring member 42, and also to be moved downwardly by its weight upon disengagement from said stirring member 42. More specifically, each of the empty state detecting plates 46 repeats the upward/downward movement per one rotation of the stirring member 42, and during the downward movement, the resistant plate 48 is subjected to resistance by the toner within the hopper 41, with the degree of the resistance being proportional to the amount of toner in the hopper 41. As the amount of toner within the hopper 41 is reduced, the position for the downward movement of the empty state detecting plate 46 is lowered, and when the toner reaches the empty state, the magnet provided on the plate 46 actuates the reed switch so as to display "toner empty" on a control panel (not shown) provided on the copying apparatus.

The developing section 60 includes the developing sleeve 61 in which the magnet roller 62 is incorporated, and which is rotatably provided between an arcuate bottom portion 5 having a toner dust preventing plate portion 6 extending upwardly therefrom and an upper toner dust preventing plate 7 of the casing 1 in a position adjacent to a photoreceptor drum 100, and a bristle height restricting plate 63 fixed to the upper portion of the casing 1, with its forward edge confronting the outer peripheral surface of the developing sleeve 61. The developing sleeve 61 formed into the cylindrical shape by a non-magnetic conductive material (e.g., aluminum) has very small concave and convex portions or undulations formed on its outer peripheral surface by a sand-blast treatment, and is coupled with the magnet roller 62 through bearings 69 (FIG. 8) so as to be driven for rotation in the direction of the arrow (e), and is disposed to confront a photoreceptor surface 100a of the photoreceptor drum 100 adapted to rotate in a direction of an arrow (f).

As shown in FIG. 2, the magnet roller 62 referred to above is alternatively magnetized by magnetic poles N1, N2, N3, N4 and N5, and S1, S2, S3, S4, S5 and S6, with the magnetic poles S3 and S4 of the same polarity being arranged to be located side by side, and is fixedly accommodated within the developing sleeve 61.

In the developing section 60 arranged as described so far, the developing material restricted by the magnetic force of the magnet roller 62 is held on the outer peripheral surface of the developing sleeve 61, and based on the rotation of the developing sleeve 61 in the direction of the arrow (e), transported over the outer peripheral surface of said developing sleeve 61 in the direction of the arrow (e), thereby to develop the electrostatic latent image formed on the surface 100a of the photoreceptor drum 100 at a developing region Y. The feeding amount of the developing material is restricted as the magnetic brush bristles of the developing material are cut off by the bristle height restricting plate 63 when they pass through said plate 63. Meanwhile, fresh developing material is supplied into a portion on the outer peripheral surface of the developing sleeve 67 and confronting the magnetic poles N3 and S3.

Figure 6:
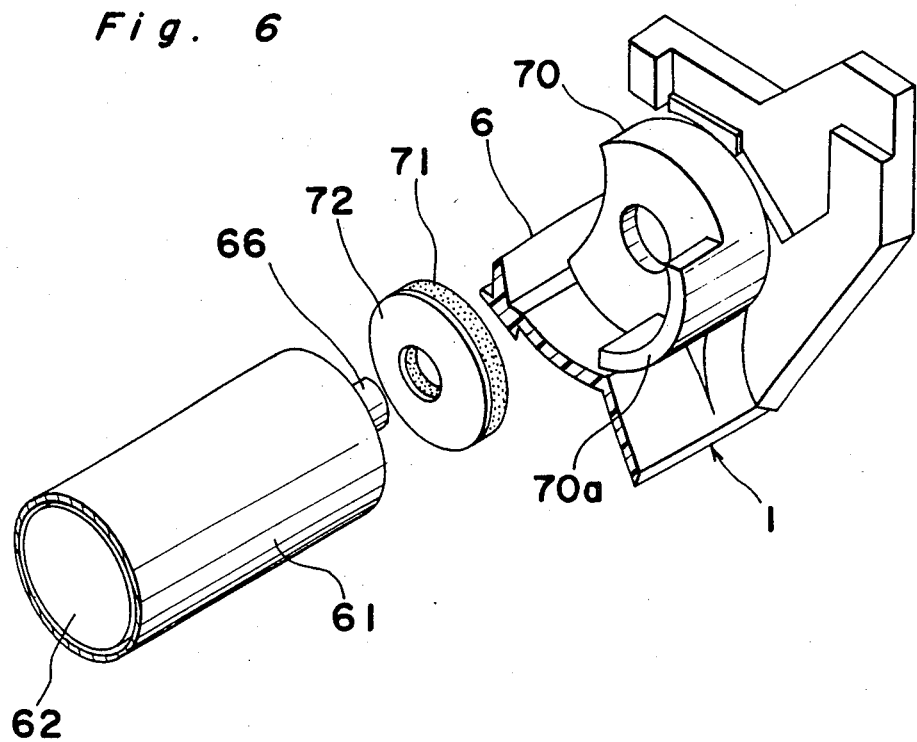
FIG. 6 is an exploded perspective view at a developing sleeve bearing portion.

Subsequently, referring to FIGS. 6 through 8, a developing material spilling prevention mechanism at opposite ends of the developing sleeve 61 will be described. More specifically, the developing material on the outer peripheral surface of the developing sleeve 61 is subjected to an internal pressure due to the supply of the developing material by the bucket roller 16 or restriction to the developing material by the bristle height restricting plate 63, and by this internal pressure, the developing material tends to the pushed outwardly at opposite end portions of the developing sleeve 61 so as to undesirably enter the bearing portions of the developing sleeve 61, or the connections between the developing sleeve 61 and the magnet roller 62, thus giving rise to such an inconvenience as seizure, etc.

Therefore, according to the present embodiment, it is so arranged that, with holders 70 fixed to the inner face of the casing 1, a support shaft 66 of the developing sleeve 61 and a support shaft 68 of the magnet roller 62 are respectively journalled in said holders 70 through bearings 67, while ends of shielding portions 70a each integrally formed with the holders 70 are adapted to extend inwardly beyond the axial end portions S of the magnetized portion of the magnet roller 62. In other words, the magnetized portions at opposite ends of the magnet roller 62 and the shielding portions 70a overlap each other by a length L. Moreover, between the end faces of the developing sleeve 61 and the corresponding inner faces of the holders 70, there are disposed sealing members 71 applied with sheets 72, for example, of Mylar (name used in trade for polyethylene glycol terephthalate film manufactured by Du Pont).

In the above arrangement, although the developing material tends to be displaced outwardly through clearances 73 between the developing sleeve 61 and the shielding portions 70a, an attracting force towards the inner side is applied thereto by the magnetic force of the magnetized end portions S of the magnet roller 62, and thus, there is no possibility that the developing material spills outwardly through said clearances 73. For effectively displaying the function as described above, it is necessary to set the overlapping length L between the magnetized portion of the magnet roller 62 and the shielding portions 70a to be 2 mm at the minimum, and also to set the gaps t for the clearances 73 to be smaller than the height of the magnetic brush bristles of the developing material.

Figure 7:
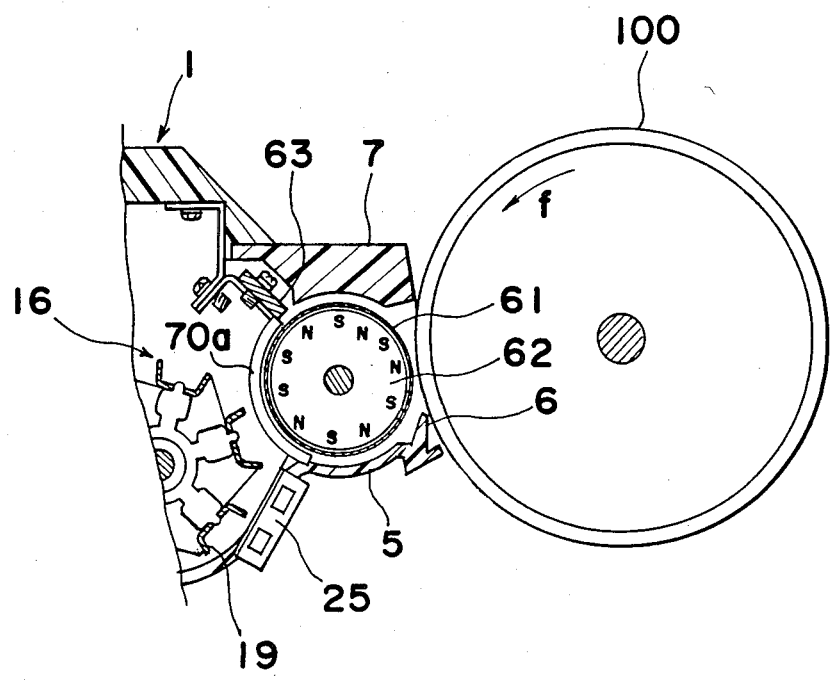
FIG. 7 is a diagram explanatory of an installing position of a shielding portion employed in the developing apparatus of FIG. 1.
Figure 8:
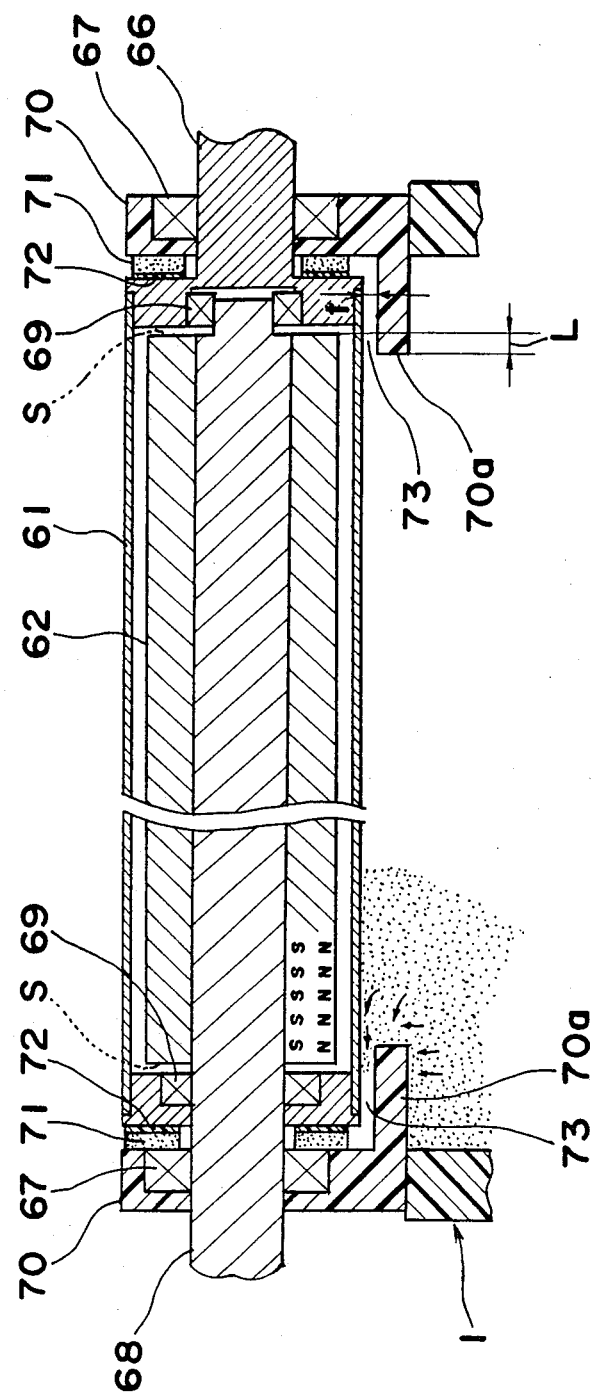
FIG. 8 is a side sectional view of a developing sleeve employed in the developing apparatus of FIG. 1.

Meanwhile, each of the shielding portions 70a of the holders 70 is formed in a circumferential direction along the outer peripheral surface of the developing sleeve 61 so as to extend between a corner of the arcuate portion 5 of the casing 1 and the bristle height restricting plate 63 (FIG. 7). This arrangement is required because the internal pressure for outwardly displacing the developing material mainly depends on the function of the bucket roller 16. Thus, the shielding portions 70a also restrict the developing material so as not to be spread outside the width of the image area on the outer peripheral surface of the developing sleeve 61 during transportation.

On the other hand, each of the sealing members 71 is made of a resilient material such as Moltopren (name used in trade for polyurethane foam, and manufactured by Bayer, West Germany) or the like, and applied onto the inner side face of the holder 70 so as to be present between said inner side face and the end face of the developing sleeve 61 under a compressed state for sealing against the dust of toner tending to leak out of the clearances 73. The Mylar sheets 72 referred to earlier function as slip members for better slippage with respect to the end face of the developing sleeve 61.

Subsequently, a driving mechanism for the screw roller 12, etc. will be described with reference to FIGS. 5(a) and 5(b).

Figure 5:
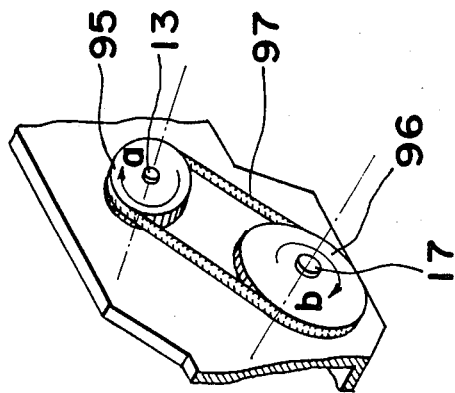
FIG. 5(a) is a fragmentary perspective view of a driving mechanism for the developing apparatus of FIG. 1.
FIG. 5(b) is a view similar to FIG. 5(a), which particularly shows a modification thereof.
Figure 5:
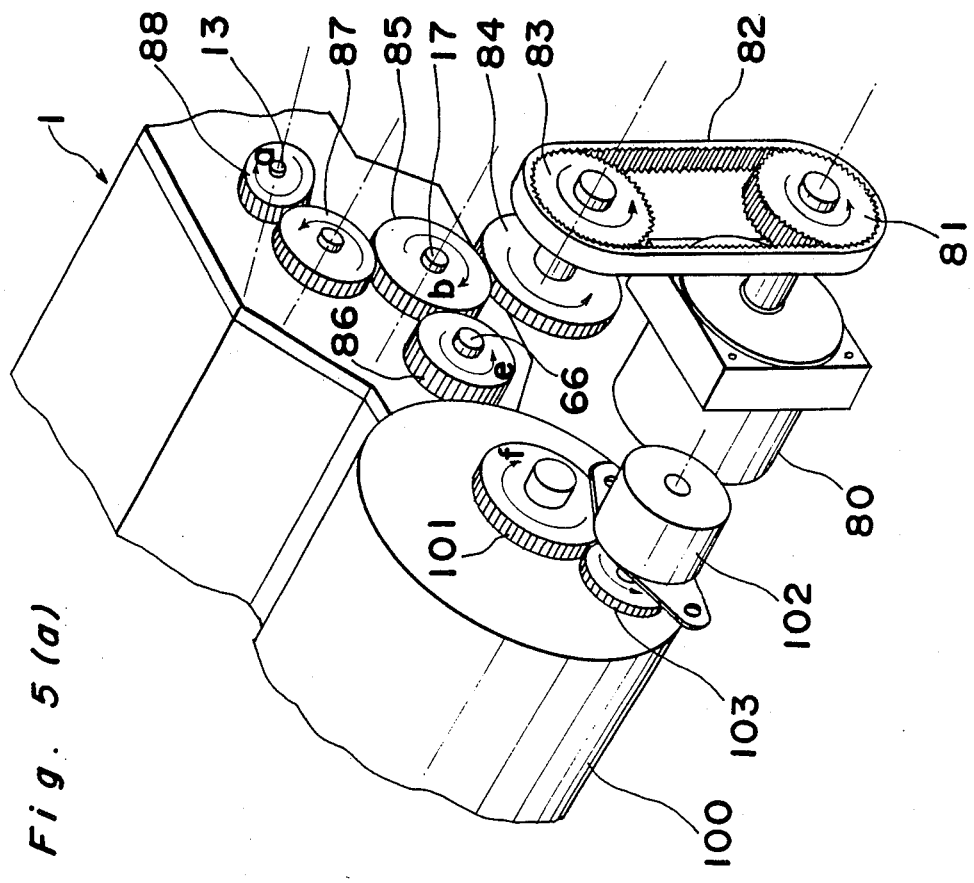

The developing apparatus according to the present invention as described so far is driven by a main motor 80 shown in FIG. 5(a). An output pulley 81 fixed to the shaft of the main motor 80 is connected to a pulley 83 through a timing belt 82, and a docking gear 84 coaxial with said pulley 83 engages a driving gear 85 fixedly mounted on the shaft 17 of the bucket roller 16. This driving gear 85 for the bucket roller 16 is in mesh with a driving gear 86 secured on the shaft 66 of the developing sleeve 61 and also, with a driving gear 88 fixed to the shaft 13 of the screw roller 12 through an idle gear 87, with the respective gears being driven for rotation in directions as indicated by the corresponding arrows.

On the other hand, the photoreceptor drum 100 is independently driven for rotation by another motor 102 through engagement of a driving gear 101 fixed to a shaft of the drum 100, with an output gear 103 secured to the shaft of said motor 102.

Incidentally, since only the screw roller 12 is disposed in the inclined state, the driving gear 88 fixed to the shaft 13 thereof has a skew angle corresponding to the angle of inclination with respect to the other gears. Therefore, in order to correct such skew angle, skew bevel teeth are employed for the gears 87 and 88, and also, for the other gears 84, 85 and 86. More specifically, on the assumption that the inclination angle of the screw roller 12 is 4°45', the gear 88 is adapted to have left hand skew bevel teeth of 10.81° and the gear 87 is arranged to have right hand skew bevel teeth of 15°. The gears 87 and 88 are corrected only for the skew angle, and the deviation in the direction of the tooth width is solved by setting the tooth width of the gear 88 to be narrow in the form of a wedge.

Moreover, by adopting the skew bevel teeth for the respective gears, thrusts in the axial direction are produced in the respective shafts so as to allow the developing sleeve 61, etc. to be accurately positioned in the axial direction, and further, to make it possible to remove side plays among the gears for elimination of noises during driving.

It is to be noted here that, if it is intended to merely correct the inclination angle of the shaft 13 for the screw roller 12, the arrangement may be, for example, so modified as shown in FIG. 5(b) that a belt 97 is passed around pulleys 95 and 96 respectively fixed to the support shafts 13 and 17.

Hereinbelow, conditions for experiments carried out by the present inventor are given in the form of a table.

|  | Conditions 1 | Conditions 2 |
| --- | --- | --- |
| Photoreceptor drum: |  |  |
| Circumferential speed (System speed) | 350 mm/sec | 180 mm/sec |
| Diameter | 100 mm | 80 mm |
| Surface charge potential (Electrostatic latent image maximum potential) | +750 V | +600 V |
| Developing Sleeve: |  |  |
| Diameter | 37 mm | 24.5 mm |
| Revolutions | 293 rpm | 280 rpm |
| Circumferential speed | 567 mm/sec | 360 mm/sec |

-continued

| | Conditions 1 | Conditions 2 |
|---|---|---|
| Developing bias | +200 V | +200 V |
| Developing gap (Ds) | 0.7 mm | 0.6 mm |
| Bristle height restriction gap (Db) | 0.6–0.7 mm | 0.6 mm |
| Spilling prevention gap (S) | 1.4 mm | 1.4 mm |
| Developing magnetic pole (N1) magnetic force | 1000 G | 1000 G |
| Bucket roller: | | |
| Revolutions | 191 rpm | 139 rpm |
| Diameter | 50 mm | 34 mm |
| Screw roller: | | |
| Revolutions | 239 rpm | 224 rpm |
| Diameter | 20 mm | 20 mm |

In the experiments under conditions 1 and 2 as listed above, there was no staying of the developing material in any of the feeding passages 11 and 15, and thus, the developing material is smoothly circulated for transportation through the feeding passages 11 and 15, thereby providing favorable results without giving rise to any uneven developing.

It is to be noted here that the electrostatic latent image developing apparatus according to the present invention is not limited to the foregoing embodiments alone, but may be modified in various ways within the scope. For example, in the embodiment as described so far, although the screw roller 12 having the partly cut-out blade plates 14 fixed on the support shaft 13 is employed for mixing and stirring of the developing material during transportation, the blade plates 14 may be replaced by a continuous spiral-shaped member, or by members having a similar shape as the vane plates 20 provided on the bucket roller 16.

Meanwhile, although the partition plate 2 for the feeding passages 11 and 15 completely separates said passages 11 and 15 from each other at its intermediate portion except for the opposite ends thereof, it may be so modified that some notches or cut-out portions are formed in said intermediate portion so that the developing material is shifted into the feeding passage 15 in the course of the passage 11 through rotation of the screw roller 12.

Furthermore, the magnet roller 62 described as fixedly accommodated in the developing sleeve 61 may be modified to be driven for rotation in the direction opposite to the feeding direction of the developing material as indicated by the arrow (e), in which case, the magnetic poles are to be sequentially magnetized in S and N poles in the circumferential direction.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An electrostatic latent image developing apparatus which comprises a first feeding passage for feeding developing material in a first direction, a second feeding passage provided side by side, adjacent to first feeding passage for feeding the developing material in a direction opposite to the first direction, each of said feeding passages having an upstream side end portion and a downstream side end portion, a passage means for communicating said first and second feeding passages at opposite ends thereof, a developing sleeve having a magnet roller incorporated therein and capable of holding the developing material on its peripheral surface, and a supplying means for supplying part of the developing material circulated for feeding within said first and second feeding passages onto said developing sleeve, the downstream passages being located in a position higher than the corresponding upstream side end portion of the adjacent feeding passage.

2. An electrostatic latent image developing apparatus as claimed in claim 1, wherein said first feeding passage is provided in a parallel relation with said developing sleeve.

3. An electrostatic latent image developing apparatus as claimed in claim 1, wherein said supplying means is provided within said first feeding passage.

4. An electrostatic latent image developing apparatus which comprises a first feeding passage for feeding developing material in a first direction, a second feeding passage provided side by side, adjacent to said first feeding passage for feeding the developing material in a direction opposite to the first direction, each of said feeding passages having an upstream side and portion and a downstream side end portion, a passage means for communicating said first and second feeding passages at opposite ends thereof, said passage means including an inclined face, a developing sleeve having a magnet roller incorporated therein and capable of holding the developing material on its peripheral surface, and a supplying means for supplying part of the developing material circulated for feeding within said first and second feeding passages onto said developing sleeve, the respective downstream side end portions of the first and second feeding passages being located in a position higher than the corresponding upstream side end portions of the adjacent feeding passages.

5. An electrostatic latent image developing apparatus as claimed in claim 4, wherein said first feeding passage is provided in a parallel relation with said developing sleeve.

6. An electrostatic latent image developing apparatus as claimed in claim 4, wherein said supplying means is provided within said first feeding passage.

7. An electrostatic latent image developing apparatus which comprises a developing sleeve having a magnet roller incorporated therein and capable of holding developing material on its peripheral surface, a first feeding passage provided parallel with the developing sleeve for supplying the developing material onto the peripheral surface of the developing sleeve and also for feeding the developing material in an axial direction of said developing sleeve, a second feeding passage disposed side by side, adjacent to said first passage, each of said feeding passages having an upstream side end portion and a downstream side end portion, said upstream side end portions of said feeding passages being located in a position lower than said corresponding downstream side end portions of said feeding passages so as to feed the developing material in the first feeding passage in a direction opposite to that of said second feeding passage, and a communicating means for communicating at least opposite end portions of said first and second feeding passages.

8. An electrostatic latent image developing apparatus as claimed in claim 7, wherein the downstream side end portion of said second feeding passage is located in a position higher than the upstream side end portion of said first feeding passage.

* * * * *